United States Patent Office 2,702,806
Patented Feb. 22, 1955

2,702,806

CHEMICAL COMPOUNDS AND PROCESSES OF PREPARING THE SAME

Martin Seidman, Chicago, Ill., and Karl Paul Link, Middleton, Wis., assignors to Wisconsin Alumni Research Foundation, Madison, Wis., a corporation of Wisconsin No Drawing. Application March 2, 1953,
Serial No. 339,938

5 Claims. (Cl. 260—343.2)

The present invention relates to new chemical compounds and processes of preparing the same. More specifically, the present invention is directed to 3,4-substituted coumarins and improved processes of preparing the same. The products of the present invention are of interest in the anticoagulant field generally and the rodenticide field specifically, and may be used as intermediates for the preparation of other products.

Shortly after the anticoagulant 3,3'-methylenebis (4-hydroxycoumarin) was isolated from spoiled sweet clover hay, identified, and synthesized, its marked toxicity in the rat was noted. H. S. Overman, J. B. Field, C. A. Baumann, and K. P. Link, J. Nutrition, 23, 589 (1942); K. P. Link, Harvey Lecture Series, 39, 162(1943–44). The results of a recent survey in the rodenticide field have shown that 3 - (α-acetonylbenzyl) - 4 - hydroxycoumarin, known in the art as warfarin, is approximately fifty times more lethal and in addition the time to effect kill is about half that required by 3,3'-methylenebis (4-hydroxycoumarin).

The products of the present invention are cyclic ketals and specially 2-methyl-2-oxy - 4 - phenyl - 5 - oxodihydropyrano (3,2-c) (1) benzopyran. The oxy groups at the 2-position are characterized by a hydrocarbon radical with double carbon to carbon bonds.

The following examples will serve to illustrate the present invention:

EXAMPLE I

2 - methyl-2-benzyloxy-4-phenyl - 5 - oxodihydropyrano (3,2-c)(1) benzopyran.—A suspension of 10 g. of warfarin in 100 ml. of benzyl alcohol was treated with hydrogen chloride until solution resulted (approximately three minutes). After standing overnight at room temperature the solution was poured into 600 ml. of ice water giving an oil. The water layer was removed by decantation and 100 ml. of methanol was added. The solution was refrigerated for five days and the solid which had formed had a melting point of 148–152° C. After recrystallization from absolute ethanol for analysis the melting point was raised to 162–163° C. The filtrate from the above was returned to the refrigerator and more crystals appeared. These had a melting point of 123–140° C. and were a mixture of diastereomeric racemates.

EXAMPLE II 2-methyl-2-allyloxy - 4 - phenyl - 5 - oxodihydropyrano (3,2-c)(1) benzopyran.—Hydrogen chloride was bubbled into a suspension of 5 g. of warfarin in 50 ml. of allyl alcohol until a clear solution resulted. After standing at room temperature for three hours the mixture was poured into 500 ml. of ice and water with stirring. A gum formed which was dissolved in 30 ml. of boiling methanol. Upon cooling crystals with a melting point of 115–140° C. appeared. Water was then added cautiously to the mother liquor until a faint turbidity was induced. Upon further cooling more product crystallized out. By repeated recrystallization of this more soluble fraction a pure racemate, melting point 121.5–123° C. was obtained.

In the above examples the "2-oxy" group is a 2-($OCH_2R'$) group where R' is selected from the group consisting of $C_6H_5$ (phenyl) and $CH=CH_2$.

The improved process of the present invention has been found to be particularly adaptable for preparing cyclic ketals in high yields. It was discovered, for example, that the presence of excess HCl did not disturb the reaction, i. e. that it was not necessary to employ a standardized 4% alcoholic HCl as called for in the Stahmann et al. Patent 2,427,579. This discovery made it possible to simplify the overall procedure materially in commercial operations. Also, as it was discovered that the reaction mixture gave off heat as the gaseous HCl was bubbled into the reaction mixture in accordance with the present invention, it was found that it was not necessary to reflux with external heat to speed up the reaction. This characteristic which makes it possible to avoid the expense of applying heat together with the characteristic noted above which makes it possible to avoid the trouble and expense of standardized solutions, coupled with the high yields obtained, makes the process of the present invention a distinct improvement, particularly in large scale commercial operations, over the process of the Stahmann et al. patent.

In addition to the reactions with aralkyl alcohols (benzyl alcohol) and unsaturated aliphatic alcohols (allyl alcohol) described in the above examples, the reaction may be carried out with warfarin and various types of alcohols providing the alcohols have an available hydroxyl group and are liquid at room temperature. The reactions carried out with ethylene glycol monoethylether and tetrahydrofurfuryl alcohol, both of which are described and claimed in our copending application Serial No. 213,485, filed March 1, 1951, now Patent No. 2,665,281, are representative examples. The reaction may also be carried out with the lower aliphatic alcohols such as methyl, ethyl, propyl, etc. liquid alcohols. The following example is illustrative.

EXAMPLE III 2-methyl-2-methoxy - 4 - phenyl - 5 - oxodihydropyrano (3,2-c) (1) benzopyran.—Sixty grams of warfarin was suspended in 300 ml. of methanol and hydrogen chloride passed in. The mixture became warm and a clear solution resulted. A mass of crystals then appeared. After cooling the product was filtered off and washed with methanol and dilute sodium hydroxide solution. The mother liquor and the washings were then poured into an excess of water and the solid which precipitated was filtered off. The combined precipitates were recrystallized from benzene, and gave 59 g. of the desired product, melting point 163–164° C. This is a 95% yield which is substantially higher than the previously reported yield of 83% employing the old process.

Warfarin possesses an asymmetric carbon atom and the form used in the above reactions was the DL racemate. Since the synthesis of the cyclic ketals results in the formation of a second asymmetric carbon atom two diastereoisomeric racemates should be formed. The products were all obtained in very good yield as mixtures of isomers.

The present application is a continuation-in-part of our application Serial No. 213,485, filed March 1, 1951, now Patent No. 2,665,281.

We claim:
1. The product, 2-methyl-2-($OCH_2R'$)-4-phenyl-5-oxodihydropyrano(3,2-c)(1) benzopyran, where R' is a hydrocarbon radical with a double carbon to carbon bond selected from the group consisting of phenyl and $CH=CH_2$.
2. The product, 2-methyl-2-benzyloxy-4-phenyl-5-oxodihydropyrano(3,2-c)(1) benzopyran.
3. The product, 2-methyl-2-allyloxy-4-phenyl-5-oxodihydropyrano(3,2-c)(1) benzopyran.
4. The process of preparing cyclic ketals which comprises bubbling gaseous hydrogen chloride at room temperature into a suspension of warfarin in an alcohol which is liquid at room temperature until the warfarin goes into solution, pouring the resulting reaction mixture containing the cyclic ketal into cold water, separating the impure reaction product from the resulting aqueous mixture and purifying the reaction product by crystallization from an organic solvent.
5. The process of claim 4 where the alcohol is methyl alcohol.

References Cited in the file of this patent

UNITED STATES PATENTS

| | | |
|---|---|---|
| 2,427,579 | Stahmann et al. | Sept. 16, 1947 |
| 2,650,233 | Seidman et al. | Aug. 25, 1953 |